US009548961B2

(12) United States Patent
Nordstrom et al.

(10) Patent No.: US 9,548,961 B2
(45) Date of Patent: *Jan. 17, 2017

(54) DETECTING ADVERSE NETWORK CONDITIONS FOR A THIRD-PARTY NETWORK SITE

(71) Applicant: Amazon Technologies, Inc., Reno, NV (US)

(72) Inventors: Paul G. Nordstrom, Seattle, WA (US); Colin Bodell, Seattle, WA (US); Craig A. Woods, Federal Way, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,171

(22) Filed: Sep. 28, 2015

(65) Prior Publication Data
US 2016/0021061 A1    Jan. 21, 2016

Related U.S. Application Data

(63) Continuation of application No. 11/694,814, filed on Mar. 30, 2007, now Pat. No. 9,148,437.

(60) Provisional application No. 60/908,380, filed on Mar. 27, 2007.

(51) Int. Cl.
*H04L 29/06* (2006.01)

(52) U.S. Cl.
CPC ....... *H04L 63/0254* (2013.01); *H04L 63/0263* (2013.01); *H04L 63/14* (2013.01); *H04L 63/1441* (2013.01); *H04L 63/1408* (2013.01)

(58) Field of Classification Search
CPC .. H04L 63/0254; H04L 63/0263; H04L 63/14; H04L 63/1441; H04L 63/1408
See application file for complete search history.

(56) References Cited

U.S. PATENT DOCUMENTS

| 7,331,060 | B1 | 2/2008 | Ricciulli |
| 7,409,712 | B1 | 8/2008 | Brooks et al. |
| 7,536,715 | B2 | 5/2009 | Markham |
| 7,574,740 | B1 | 8/2009 | Kennis |
| 7,591,011 | B1 | 9/2009 | Droux et al. |

(Continued)

OTHER PUBLICATIONS

Cubaleska et al., Applying Trust Policies for Protecting Mobile Agents Against DoS, Jun. 2002, Third International Workshop on Policies for Distributed Systems and Networks, pp. 198-201.*

(Continued)

*Primary Examiner* — Kenneth Chang
(74) *Attorney, Agent, or Firm* — Seed IP Law Group LLP

(57) ABSTRACT

A network protection service for providing protective assistance to a subscribing host is presented. The network protection service is configured determine a set of rules for filtering network traffic for a subscribing host. The network protection service is further configured to receive network traffic on behalf of the subscribing host, filter the received network traffic according to the set of rules, and forward a portion of the filtered network traffic to the subscribing host. Still further, the network protection service is configured to analyze the received network traffic via the analysis server, and refine the set of rules for filtering the received network traffic based on the analysis of the received network traffic by the analysis server.

20 Claims, 10 Drawing Sheets

(56) References Cited

U.S. PATENT DOCUMENTS

| | | |
|---|---|---|
| 7,702,739 B1 | 4/2010 | Cheng et al. |
| 2001/0042200 A1 | 11/2001 | Lamberton et al. |
| 2002/0073155 A1 | 6/2002 | Anupam et al. |
| 2002/0073337 A1 | 6/2002 | Ioele et al. |
| 2002/0083175 A1 | 6/2002 | Afek et al. |
| 2002/0116607 A1* | 8/2002 | Boies .................. H04L 63/02 713/153 |
| 2002/0133721 A1 | 9/2002 | Adjaoute |
| 2002/0162026 A1 | 10/2002 | Neuman et al. |
| 2002/0166063 A1 | 11/2002 | Lachman, III et al. |
| 2002/0166068 A1 | 11/2002 | Kilgore |
| 2002/0178378 A1 | 11/2002 | Shively |
| 2002/0198956 A1 | 12/2002 | Dunshea et al. |
| 2003/0004688 A1 | 1/2003 | Gupta et al. |
| 2003/0014665 A1 | 1/2003 | Anderson et al. |
| 2003/0023733 A1 | 1/2003 | Lingafelt et al. |
| 2003/0035370 A1 | 2/2003 | Brustoloni |
| 2003/0061514 A1 | 3/2003 | Bardsley et al. |
| 2003/0084329 A1 | 5/2003 | Tarquini |
| 2003/0101260 A1 | 5/2003 | Dacier et al. |
| 2003/0126468 A1 | 7/2003 | Markham |
| 2003/0145225 A1 | 7/2003 | Bruton, III et al. |
| 2003/0204621 A1* | 10/2003 | Poletto .................. H04L 45/00 709/239 |
| 2003/0204632 A1 | 10/2003 | Willebeek-LeMair et al. |
| 2003/0233328 A1 | 12/2003 | Scott et al. |
| 2004/0004941 A1 | 1/2004 | Malan et al. |
| 2004/0049574 A1 | 3/2004 | Watson et al. |
| 2004/0073800 A1 | 4/2004 | Shah et al. |
| 2004/0117624 A1 | 6/2004 | Brandt et al. |
| 2004/0128538 A1 | 7/2004 | Gmuender et al. |
| 2004/0148520 A1 | 7/2004 | Talpade et al. |
| 2004/0190522 A1 | 9/2004 | Aerrabotu et al. |
| 2004/0199793 A1 | 10/2004 | Wilken et al. |
| 2005/0037733 A1 | 2/2005 | Coleman et al. |
| 2005/0039104 A1 | 2/2005 | Shah et al. |
| 2005/0050338 A1 | 3/2005 | Liang et al. |
| 2005/0086502 A1 | 4/2005 | Rayes et al. |
| 2005/0138171 A1* | 6/2005 | Slaight ................ H04L 12/4641 709/225 |
| 2005/0180416 A1 | 8/2005 | Jayawardena et al. |
| 2005/0182950 A1 | 8/2005 | Son et al. |
| 2005/0262556 A1 | 11/2005 | Waisman et al. |
| 2005/0278415 A1 | 12/2005 | Corbea et al. |
| 2006/0048142 A1 | 3/2006 | Roese et al. |
| 2006/0050719 A1 | 3/2006 | Barr et al. |
| 2006/0095965 A1 | 5/2006 | Phillips et al. |
| 2006/0137012 A1 | 6/2006 | Aaron |
| 2006/0173992 A1 | 8/2006 | Weber et al. |
| 2006/0174028 A1* | 8/2006 | Zhu .................. H04L 63/1408 709/232 |
| 2006/0193470 A1 | 8/2006 | Williams |
| 2006/0212524 A1 | 9/2006 | Wu et al. |
| 2006/0212572 A1 | 9/2006 | Afek et al. |
| 2006/0230444 A1 | 10/2006 | Iloglu et al. |
| 2007/0056030 A1 | 3/2007 | Kay |
| 2007/0058645 A1* | 3/2007 | Nannra ................ H04L 41/046 370/401 |
| 2007/0107043 A1* | 5/2007 | Newstadt ............. H04L 63/102 726/2 |
| 2007/0113284 A1* | 5/2007 | O'Rourke ............ H04L 63/0227 726/23 |
| 2007/0157316 A1 | 7/2007 | Devereux et al. |
| 2007/0180510 A1 | 8/2007 | Long et al. |
| 2007/0180511 A1 | 8/2007 | Eastlake, III |
| 2008/0016566 A1* | 1/2008 | Raz .................. H04L 63/1458 726/22 |
| 2008/0101223 A1* | 5/2008 | de los Reyes ........ H04L 63/145 370/230 |
| 2008/0176536 A1 | 7/2008 | Galluzzo et al. |

OTHER PUBLICATIONS

Chan et al., "IDR: An Intrusion Detection Router for Defending Against Distributed Denial-ofService (DDoS) Attacks," May 2004, Proceedings of the 7th International Symposium on Parallel Architectures, Algorithms and Networks, pp. 581-586.

Qin et al., "Integrating Intrusion Detection and Network Management," IEEE/IFIP Network Operations and Management Symposium, 2002, pp. 329-344.

* cited by examiner

US 9,548,961 B2

DETECTING ADVERSE NETWORK CONDITIONS FOR A THIRD-PARTY NETWORK SITE

CROSS-REFERENCES TO RELATED APPLICATIONS

This application is related to the following commonly assigned and co-filed patent applications: Protecting Network Sites During Adverse Network Conditions, U.S. patent application Ser. No. 11/694,806, now U.S. Pat. No. 8,209,748; Monitoring a Network Site to Detect Adverse Network Conditions, U.S. patent application Ser. No. 11/694,811, now U.S. Pat. No. 8,310,923; Protecting a Network Site During Adverse Network Conditions, U.S. patent application Ser. No. 11/694,858, now U.S. Pat. No. 9,143,516; and Providing Continuing Service for a Third-Party Network Site During Adverse Network Conditions, U.S. patent application Ser. No. 11/694,824, now U.S. Pat. No. 8,042,171.

BACKGROUND

In many ways, the emergence of the Internet has revolutionized the business world. Now it is almost imperative that a business have an online presence. Many companies spend substantial amounts of money in developing enticing and sophisticated Web sites in order to provide customers with a positive image of the company in an effort to attract business. Many companies now conduct critical activity via their network sites such as, but not limited to, e-mail, e-filing, document exchange, posting critical information or news, conducting commercial transactions, and the like. Indeed, there are many businesses that rely entirely on a virtual storefront, i.e., to purchase a product you must do so through the company's online site.

Though companies increasingly rely upon their online presence to conduct various aspects of business, there are numerous threats to their online presence against which they need protection. Malware, a term derived from the combination/concatenation of "malicious software," generally and broadly includes computer viruses, Trojan horses, worms, buffer overrun attacks, spyware, adware, and the like. Malware variants are constantly released on the Internet to carry out the various nefarious designs on susceptible network sites. In order to prevent their sites from "infection" by the malware, companies invest in protective software and hardware such as anti-virus and anti-spyware software, firewalls, and the like, to form a protective shield around the online site.

While companies have a continuing need to maintain and update their protective shields against malware, there are some types of network attacks that still get through. Indeed, some attacks penetrate a company's protective shield because they do not fit the general definition of malware in that the attacks arrive and appear as legitimate network traffic. These attacks include denial of service attacks and poison pill attacks.

A denial of service ("DoS") attack intentionally floods a targeted system with a large volume of incoming messages such that the targeted system cannot handle the network traffic and must shut down, or worse, crashes. FIG. 1A is a pictorial diagram that illustrates a typical network environment 100. The network environment 100, by way of example only, includes a host 102 which interacts with one or more other computing devices, such as client computers 104-106 and 110-112, over a network 108. Under a DoS attack, as illustrated in the pictorial diagram of FIG. 1B, a node on the network 108, i.e., one of the computing devices on the network such as client computer 104, floods the host 102 with network traffic such that the host cannot manage all incoming traffic. As a result, the host 102 may drop or deny service to incoming traffic from legitimate users, such as from client computers 106 or 112. From the legitimate user's perspective, the host 102 is frozen, i.e., not responding to network traffic.

Frequently, a DoS attack is carried out in a coordinated, distributed manner by a botnet. A botnet (derived from the term "robot network") corresponds to a fleet of computers, typically compromised by a Trojan horse virus, configured to respond to a network call to participate in a coordinated DoS attack (also called a distributed DoS attack or DDoS). FIG. 1C is a pictorial diagram illustrating a DDoS attack on host 102 from the various computers connected to the network 108. As is well appreciated by those skilled in the art, depending on the size of the botnet, a DDoS attack can substantially increase the intentional flood of network traffic to the host 102.

In contrast to a DoS or DDoS attack, a poison pill attack may be a single message to a network service, such as a Web service, that causes the receiving service to struggle to respond. For example, a poison pill communication may cause a particular component of a Web service to execute, wherein the component has a flaw or bug. During executing, the flaw is encountered and the component crashes. This component crash, in turn, may cause the Web service to cease functioning or otherwise take an inordinate amount of processing time to respond to the poison pill request. Clearly, a poison pill attack may be submitted intentionally or unintentionally; yet in either case, the Web service is significantly compromised.

In addition to malicious or intentional attacks, online sites are at risk from legitimate network traffic. For instance, suppose a network site, as a promotional campaign, makes a particularly good offer for a product and assumes, based on the history of network traffic at the site, a particular level of network traffic will be received. Suppose further that, due to some social networking, the interest generated with regard to this offer exceeds the network site's expectations. Realistically, that network site may be overwhelmed by a dramatic increase or spike in legitimate network traffic requesting the particular offer. This spike in network traffic, though legitimate, poses the same risks to the network site as a DDoS attack.

Without changing the nature of the Internet, or networking in general, the solution to DoS, DDoS, poison pill attacks, or overwhelming spikes in legitimate network traffic, is to have significant network processing bandwidth/capacity in reserve such that when these adverse network conditions arise, a network service such as host 102 can handle the incoming traffic. Unfortunately, the amount of reserved processing bandwidth necessary to identify and respond to unforeseen capacity requirements, such as a DoS or DDoS attack, is huge in comparison to the processing bandwidth during normal operations, and the cost to deploy and maintain such reserves is viewed as prohibitive to all but a very few companies.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
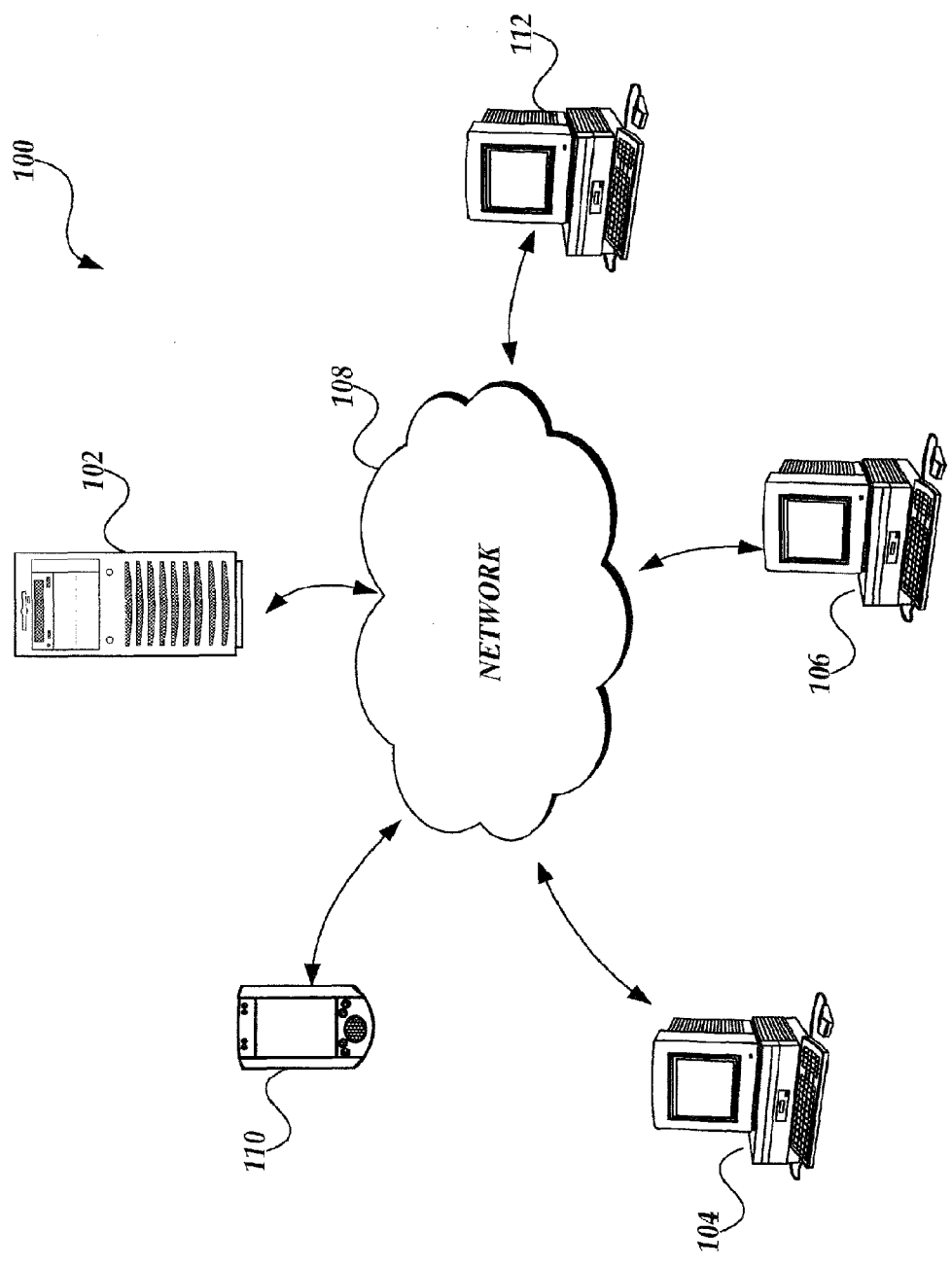
FIGS. 1A-1C are pictorial diagrams of a network environment for illustrating the susceptibility of a host 102 under typical conditions and under DoS and DDoS attack.

As set forth below, the disclosed subject matter is generally directed towards providing an ongoing level of service on behalf of a network site when that network site is experiencing difficulty in responding, or simply cannot respond at all, to ongoing network traffic due to adverse network traffic conditions or other conditions that prevent the network site from managing and processing the ongoing network traffic.

According to aspects of the disclosed subject matter, a network protection service for providing protective assistance to a subscribing host is presented. The network protection service is communicatively coupled to the subscribing host via a network, and comprises a network connection connecting the network protection service to the network, and an analysis server for analyzing received network traffic. The network protection service is configured determine a set of rules for filtering network traffic for the subscribing host. The network protection service is further configured to receive network traffic on behalf of the subscribing host, filter the received network traffic according to the set of rules, and forward a portion of the filtered network traffic to the subscribing host. Still further, the network protection service is configured to analyze the received network traffic via the analysis server, and refine the set of rules for filtering the received network traffic based on the analysis of the received network traffic by the analysis server.

According to additional aspects of the disclosed subject matter, a method for providing improved protective assistance to a subscribing host is presented. When implemented by a network protection service communicatively coupled to the subscribing host over a network, the method comprises determining a set of rules corresponding to the subscribing host for filtering network traffic directed to the subscribing host. The method also comprises receiving network traffic directed to the subscribing host, filtering the received network traffic according to the set of rules, and forwarding a portion of the filtered network traffic to the subscribing host. Still further, the method comprises analyzing the received network traffic directed to the subscribing host and refining the set of rules for filtering the received network traffic according to the results of the analysis.

According to yet additional aspects of the disclosed subject matter, a tangible computer-readable medium bearing computer-executable instructions for providing improved protective assistance to a subscribing host is presented. When executed on a network protection service, the computer-executable instructions carry out a method comprising determining a set of rules corresponding to the subscribing host for filtering network traffic directed to the subscribing host. The method further comprises receiving network traffic directed to the subscribing host, filtering the received network traffic according to the set of rules, and forwarding a portion of the filtered network traffic to the subscribing host. The method also comprises analyzing the received network traffic directed to the subscribing host and refining the set of rules for filtering the received network traffic according to the results of the analysis.

In accordance with aspects of the disclosed subject matter, a network protection service is provided. The network protection service is coupled to the network and, as will be described in greater detail below, provides assistance to a network site (referred to as a subscribing host) when the subscribing host is experiencing adverse network conditions (such as when a DoS, DDoS, or legitimate spike in network traffic occurs) such that the subscribing host is unable to process the incoming network traffic at a satisfactory level. Of course, while the following discussion is made in regard to keeping a network site operational during adverse network conditions, the disclosed subject matter is equally beneficial when applied to various conditions unrelated to network traffic. More particularly, the disclosed subject matter may be beneficially applied when the network site is unable to respond, under conditions such as, but not limited to, a power outage, a system failure (unrelated to incoming network traffic), downed communication lines, a planned "outage" to upgrade hardware and/or software, and the like.

It should be appreciated that, while the following description is generally made in regard to providing assistance to a commercial network site under adverse network traffic conditions, the disclosed subject matter should not be viewed as being so limited. Indeed, non-commercial and personal network sites can similarly benefit from the assistance of a network protection service when experiencing adverse network conditions, and providing such assistance to non-commercial and/or personal network sites is considered as falling within the scope of the present disclosure.

While the following description of the disclosed subject matter is made in terms of protecting a network site, also referred to as a subscribing host, this is done in order to simplify the description and should not be viewed as limiting upon the scope of the disclosed subject matter. Those skilled in the art will appreciate that the network protection service, as set forth herein, may be configured to protect aspects, nodes, services, and/or domains of a particular network site. A relationship may be established such that the network protection service steps in and provides protective assistance only when a particular domain of the network site is experiencing adverse network conditions. For example, a network site may have various domains directed to catalog, transaction processing, and IT support services, and the network protection service provides protective assistance only when the transaction processing domain experiences adverse network traffic conditions. Further still, and as is well understood, while the following description is made in regard to a subscribing host as though it were a single network device, in fact a subscribing host may correspond to a collection of networked nodes or devices distributed throughout the network.

The network protection service provides sufficient resources to satisfy an agreed upon level of assistance to a subscribing host during times when the subscribing host is experiencing adverse network conditions. The network protection service is prepared to handle a variety of adverse network conditions and, when various adverse network conditions arise, is prepared to allocate resources accordingly. A subscribing host may request the network protection service to determine a level of assistance for the subscribing host when the adverse network conditions arise. Similarly, the level of assistance may dynamically adjust based on historical assistance requirements, the nature of the adverse network conditions, changes to the subscribing host network traffic patterns, network environments, and the like.

Figure 1B:
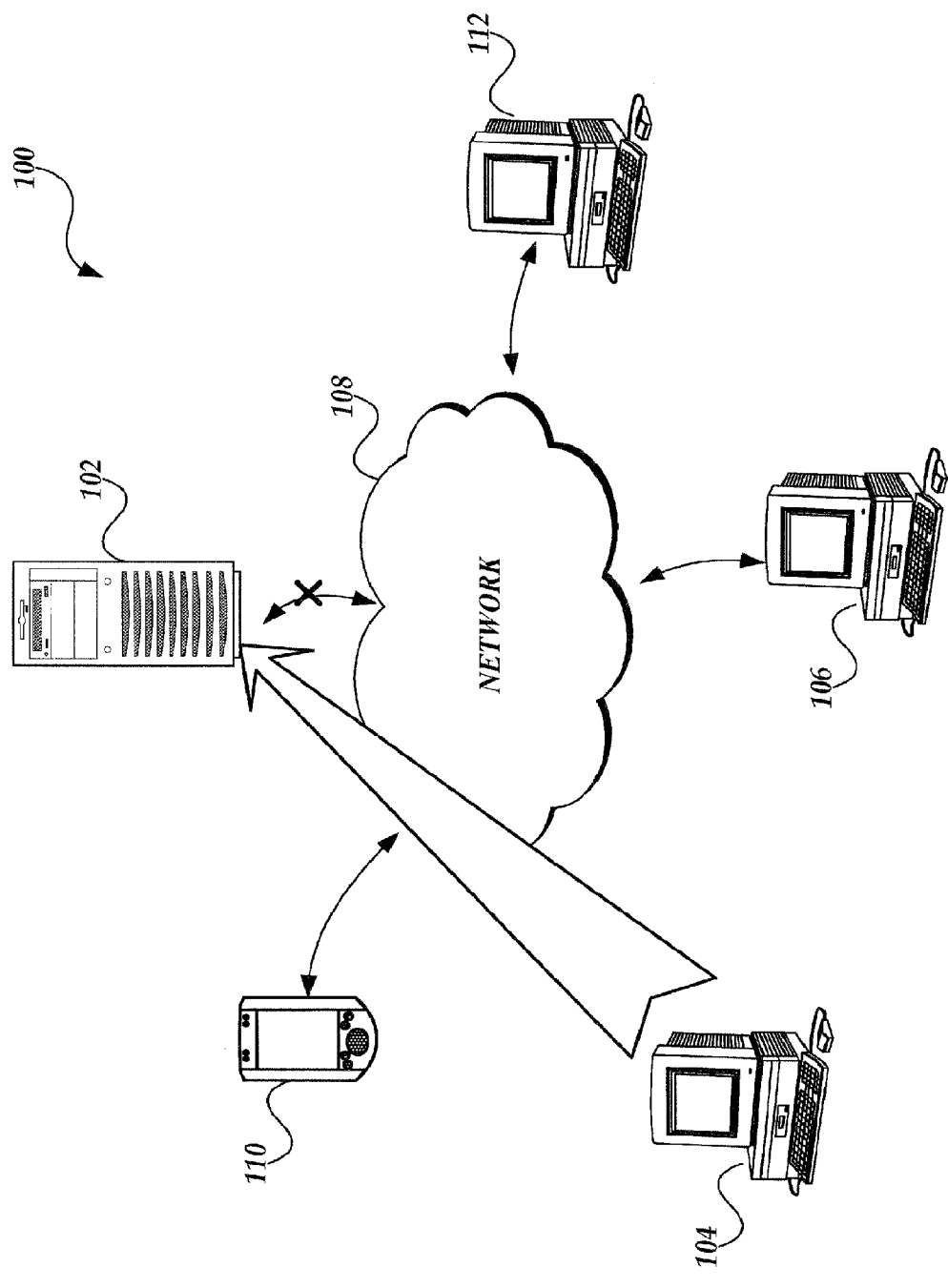
Figure 1C:
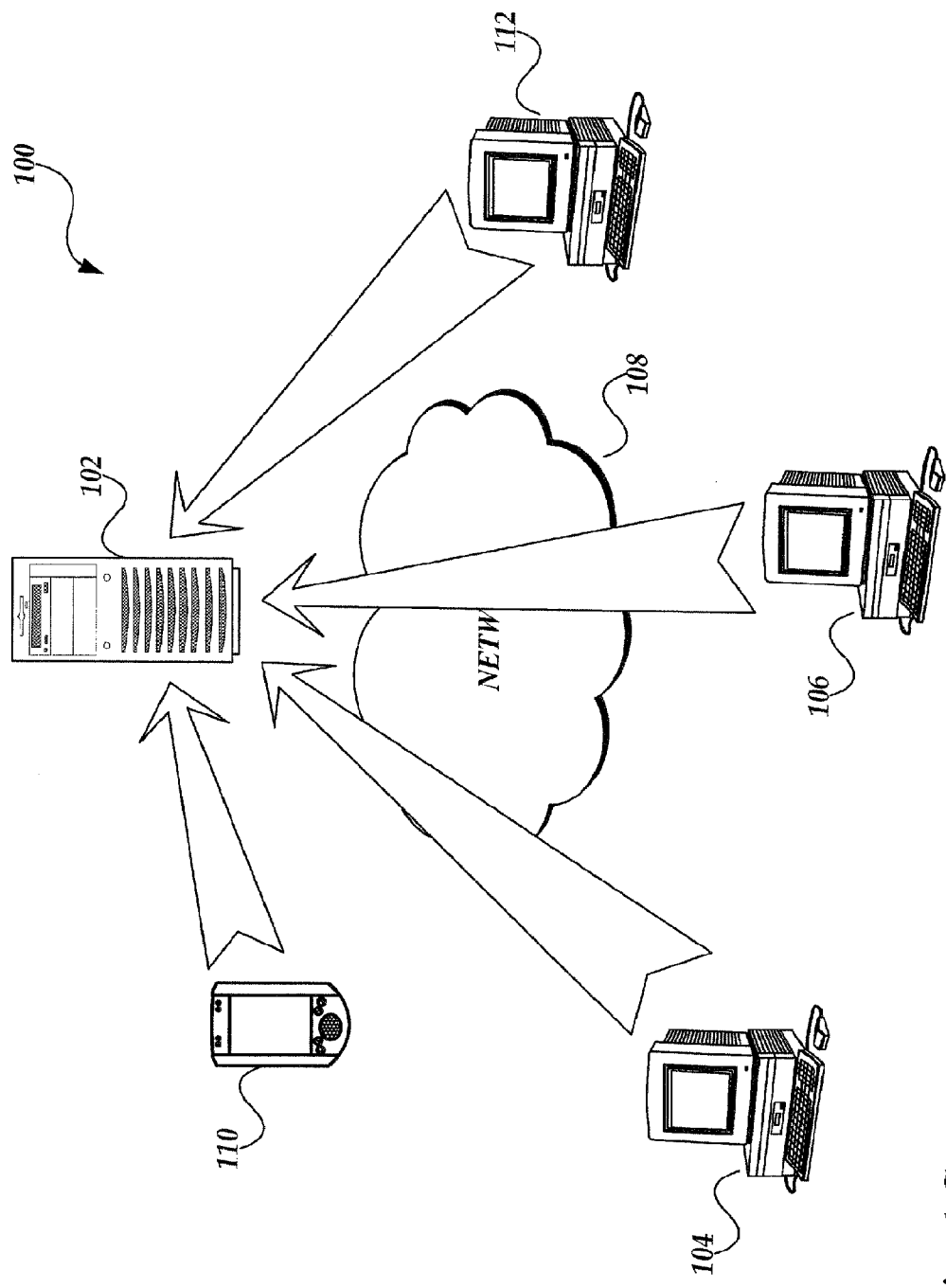
Figure 2:
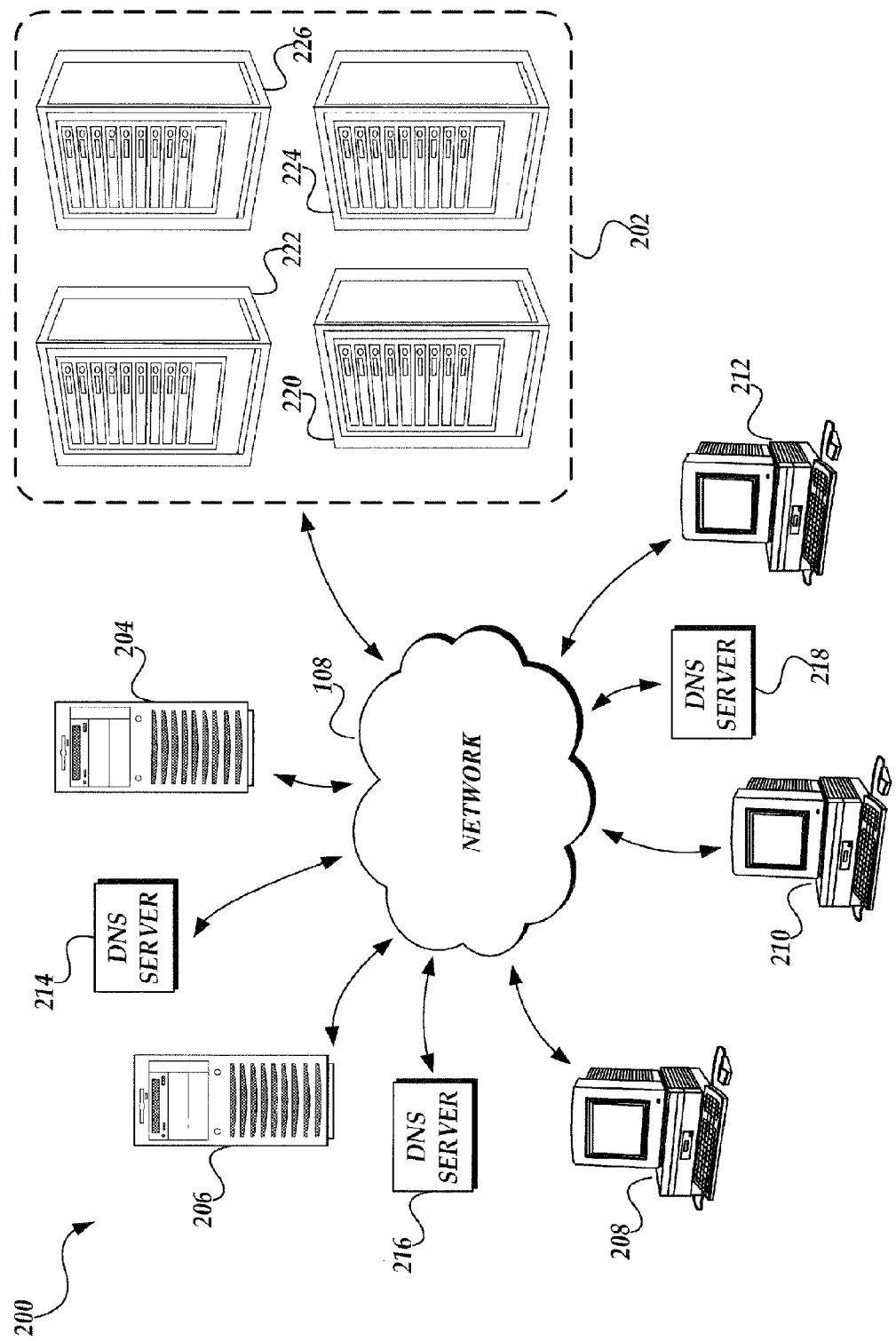
FIG. 2 is a pictorial diagram of an illustrative network environment including a network protection service suitable for assisting a subscribing host during times of adverse network traffic.

FIG. 2 is a pictorial diagram of an illustrative network environment 200 which, unlike the network environment 100 of FIGS. 1A-1C, includes a network protection service 202 connected to a network 108. Also illustrated as being connected to the network 108 are a plurality of computing devices 204-212 corresponding to commercial and non-commercial network sites, such as sites 204 and 206, as well as user computers such as computers 208-212. Also shown in the illustrative network environment 200 is a plurality of Domain Name System (DNS) servers 214-218. As those skilled in the art will appreciate, DNS servers provide a mapping between common user-understandable network names and specific network addresses for the various computers on the network.

Typically, a network protection service, such as network protection service 202, will include a plurality of computing devices, such as devices 220-226, configured to process network traffic on behalf of a subscribing host. Typically, computing devices 220-226 are capable of providing high capacity and high performance when compared to the computing capabilities of computing devices 204-212. However, this should be viewed as illustrative, and not be viewed as limiting upon the disclosed subject matter. More particularly, in one embodiment (not shown), the network protection service 202 includes a single computing device for assisting a subscribing host when the subscribing host is experiencing adverse network traffic. The network protection service 202 will also typically be connected to the network 108 via one or more high capacity network connections in order to provide protective assistance to the subscribing host during times of adverse network traffic. Again, typically the capacity of the network connection of the network protection service 202 is high in comparison to the capacity of network connections for other computing devices in the network environment 200.

According to various embodiments of the disclosed subject matter, while the network protection service 202 is configured to have a large capacity reserve to process network traffic, not all of the processing capacity is necessarily utilized for any one situation. In one embodiment, the network protection service 202 is configured to determine the amount of processing capacity needed for current network conditions and provide commensurate processing capacity from its reserves. Accordingly, in at least one embodiment, the plurality of high capacity, high performance computing devices 220-226 correspond to a cluster of computing devices which may be dynamically allocated to provide protective assistance to a subscribing host according to ongoing network traffic. In one embodiment, the various computing devices 220-226 are UNIX-based computers within a cluster. However, any type of computing device, such as mini- and mainframe computers, personal computers, laptops, blade computing devices, and the like, irrespective of operating system, may be used for processing network traffic as part of providing protective assistance to a subscribing host. Indeed, custom network processing devices may also be utilized as processing devices by the network protection service.

While the network protection service 202 is illustrated as a single entity, it should be appreciated that, in an alternative embodiment (not shown), a network protection service may be implemented as a plurality of sites distributed throughout the network. Accordingly, the configuration shown in FIG. 2 should be viewed as illustrative only and not limiting upon the disclosed subject matter.

In order to provide effective assistance, a site, such as subscribing host 204, would establish a relationship with the network protection service 202. Indeed, the subscribing host 204 and the network protection service 202 will arrange for the type of protection that the network protection service will provide to the subscribing host 204, the conditions that will trigger the network protection service 202 to implement the arranged protection, the defined communication channels that will be used during times of adverse network conditions, the conditions under which assistance will be withdrawn, costs for the subscription and assistance, and the like.

Figure 3A:
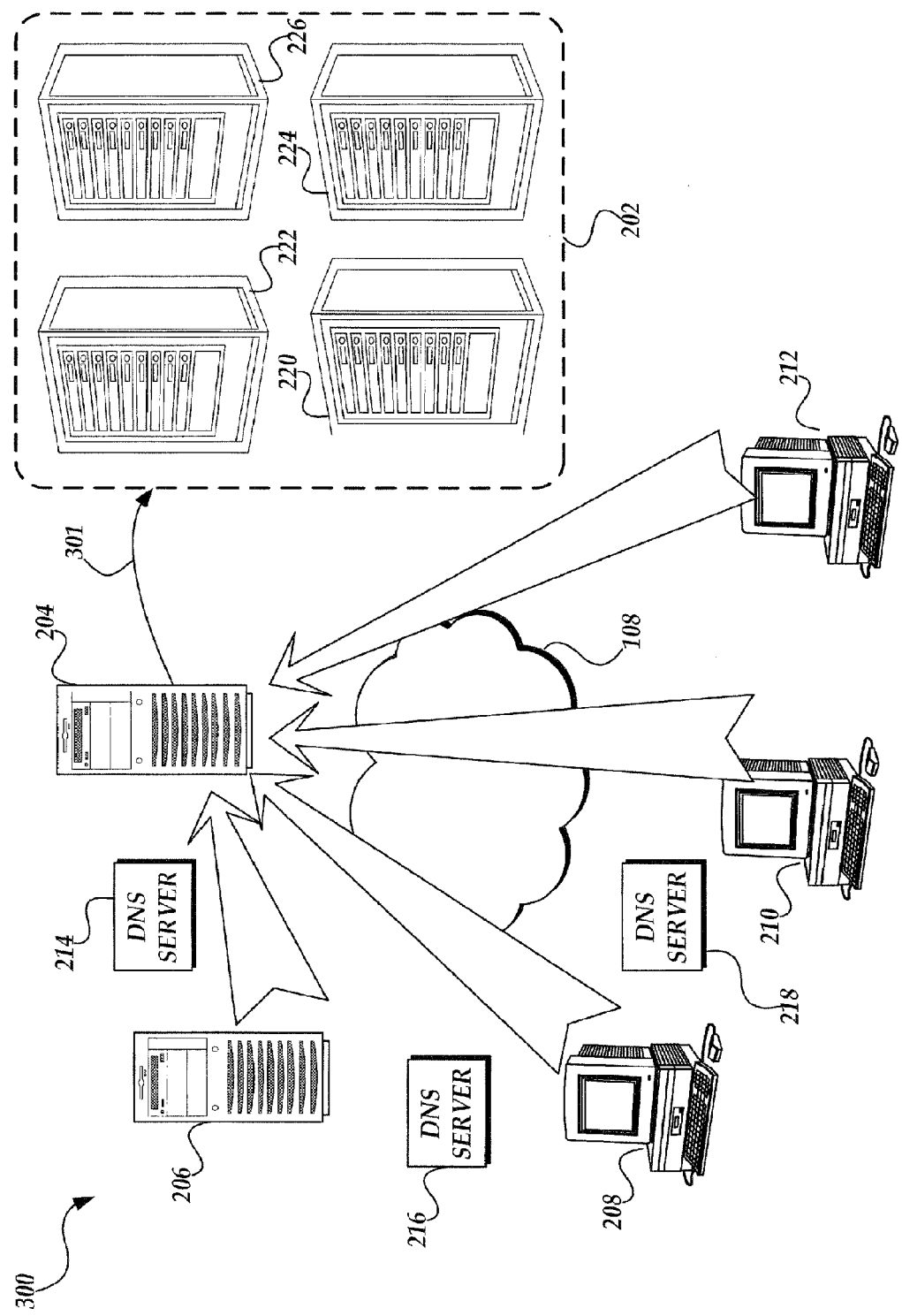
FIGS. 3A and 3B are pictorial diagrams of a network environment configured to assist a subscribing host under adverse network conditions and for illustrating, at a general level, how the assistance is provided.
Figure 3B:
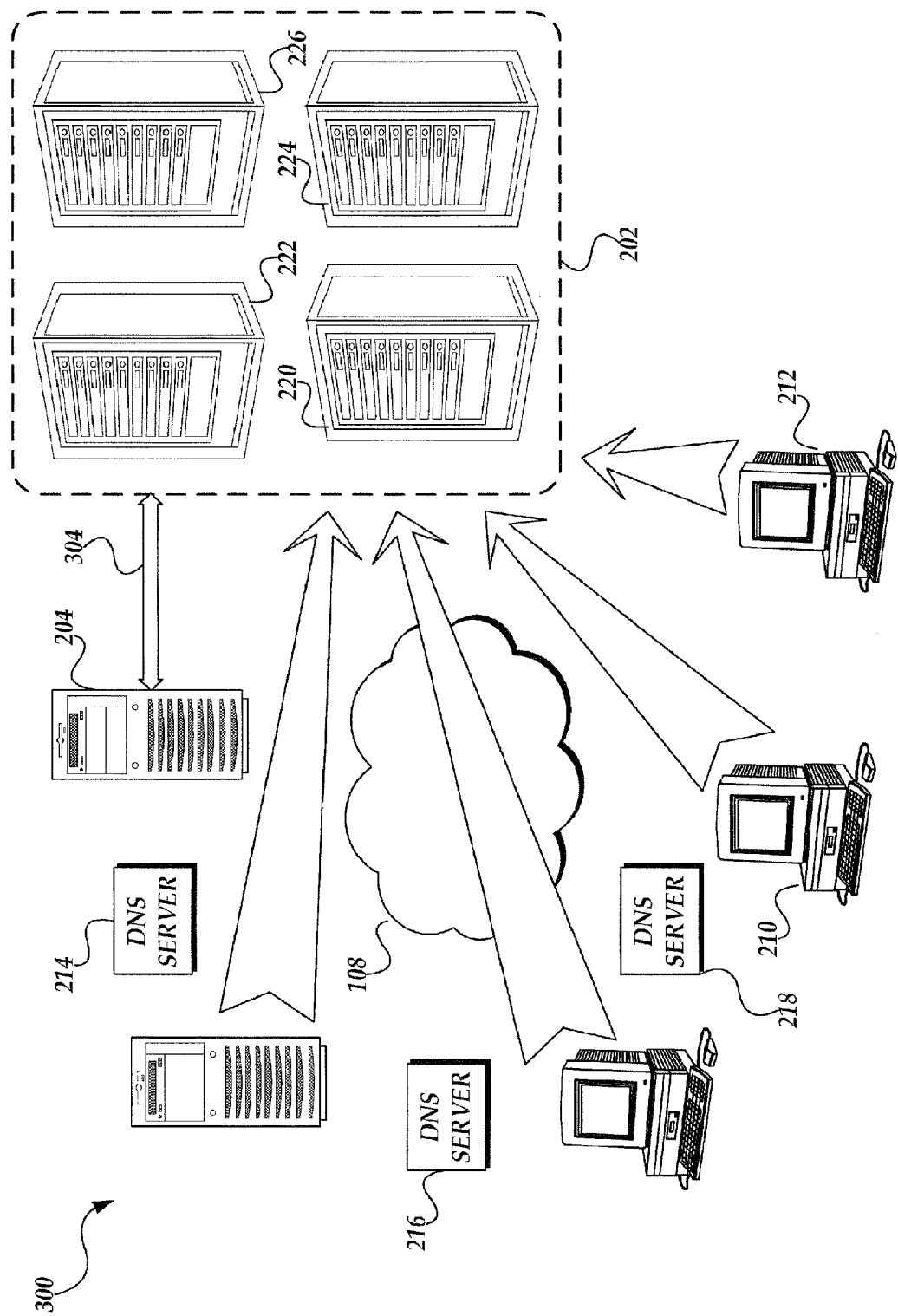

In order to better illustrate aspects of the network protection service and the manner in which it provides assistance to a subscribing host, reference will be made to FIGS. 3A and 3B. FIGS. 3A and 3B are pictorial diagrams of the networked environment 200 of FIG. 2 including a network protection service 202 and a subscribing host 204, as well as other computers and devices, all connected via a network 108. It is assumed that subscribing host 204 has established a relationship with the network protection service 202 to assist the subscribing host during times that it experiences adverse network conditions (such as DoS attacks, poison pill attacks, network traffic spikes, and the like). Turning first to FIG. 3A, this pictorial diagram illustrates computing devices 206-212 participating in a DDoS attack on subscribing host 204. As is typical of a DDoS attack, the volume of traffic to the subscribing host 204 is such that the subscribing host cannot process all incoming network traffic and is likely facing a system failure/crash. Under these conditions, the subscribing host 204 signals the network protection service 202, alerting it to the prevailing adverse network traffic/conditions, as indicated by arrow 301.

With regard to signaling the network protection service 202 of the adverse network traffic, it should be appreciated that while in one embodiment the subscribing host 204 transmits a communication to the network protection service that is transmitted over the network 108, in some circumstances the subscribing host is incapacitated such that it cannot transmit the signal. In an alternative embodiment, "signaling" could be implemented in a variety of manners, including a telephone call by a person associated with the subscribing host to the network protection service 202 regarding the adverse network conditions. In another embodiment, the subscribing host 204 periodically sends messages to the network protection service 202 indicating that network traffic conditions are good. Correspondingly, a failure of the subscribing host 204 to transmit some number of "normal" message acts as a signal to the network protection service 202 indicating the subscribing host is experiencing adverse network conditions. In still another embodiment, the network protection service 202 queries the subscribing host 204 to determine whether the network conditions are acceptable, or whether protective assistance is needed. The queries may be sent periodically and/or randomly. In one embodiment, the subscribing host 204 responds by providing an indication of the current level of network traffic it is experiencing, enabling the network protection service 202 to analyze traffic patterns for use in developing heuristics and other rules for providing assistance. Note, the various mechanisms for communication between the subscribing host 204 and the network protection service 202 may include combinations of those described herein. For example, the subscribing host 204 may send a periodic indicator, perhaps a single bit, identifying acceptable traffic conditions. If the network protection service 202 detects a missing indicator, then the network protection service 202 sends a query. Similarly, the period for transmission of the periodic indicator may dynamically change in response to traffic conditions or other network environment considerations.

In yet another embodiment, the network protection service 202 monitors the level of network traffic flowing to the subscribing host 204 over the network 108 by routing all or some of the network traffic directed to the subscribing host through the network protection service. In this way, the network protection service 202 can actively, rather than reactively, analyze the prevailing network conditions, and provide assistance as the need arises. Of course, one of the drawbacks to actively monitoring the network traffic is the increased costs of actively monitor all or some network traffic, as the network protection service 202 dedicates a certain amount of network processing bandwidth to the subscribing host 204.

Another factor to consider in detecting the condition for implementing the protecting assistance includes whether the current network traffic directed to the subscribing host 204 exceeds a particular threshold in regard to the subscribing host's capacity for processing the network traffic. For example, even through the subscribing host 204 is experiencing adverse network conditions, unless the current network traffic exceeds 110% of the estimated network traffic processing capacity of the subscribing host, the network protection service 202 may decide not to implement protective assistance. This threshold will typically be determined between the subscribing host 204 and network protection service 202 when establishing the relationship between the two. Still further, different thresholds may apply to the various domains/nodes that the subscribing host 204 may have and/or choose to protect.

Irrespective of the manner in which the network protection service 202 detects a need for protective assistance, the network protection service implements the agreed upon actions (per the subscription agreement between the subscribing host 204 and the network protection service 202) according to the present needs of the subscribing host 204. These actions include, but are not limited to, reducing network traffic such that only a percentage of the total network traffic directed to the subscribing host 204 reaches the subscribing host (according to the capacity of the subscribing host to process the traffic), rejecting all network traffic until the adverse network traffic/conditions subside or until the subscribing host is capable of handling the traffic, offloading processing from the subscribing host by processing/responding to static requests (as described below in greater detail), opening and routing traffic that reaches the subscribing host through a private communication channel or port, e.g., a non-standard port not typically associated with sending and/or receiving network traffic, intelligently filtering traffic such that legitimate communication requests are permitted to flow to the subscribing host (either through the host's normal communication ports or through a private port), and the like.

Continuing with the example above, FIG. 3B is a pictorial diagram illustrating actions that may be taken by the network protection service 202 to assist and protect the subscribing host 204 when the host is experiencing the adverse network traffic of a DDoS attack. In this example, in order to assist the subscribing host 204, the network protection service 202 reroutes (or, to be more technically accurate, causes to be rerouted) network traffic directed to the subscribing host 204 through the network protection service. In one embodiment, rerouting is accomplished by notifying the various DNS servers, such as DNS servers 214-218, in the network 108 that the network address corresponding to the domain "name" of the subscribing host corresponds to one or more addresses of the network protection service. In this manner, as the various "bots" in the botnet send the voluminous traffic to the named host and, as other computers send legitimate network traffic to the named host, the routing devices (not shown) resolve the name to the network protection service 202 and traffic is routed to the service. The net effect of this is that the network traffic is routed to the network protection service 202, as shown in FIG. 3B.

While the current discussion is made in regard to rerouting all or some of the current network traffic intended for the subscribing host 204 to the network protection service 202, this is for illustration and not to be viewed as limiting. In one embodiment, the network protection service 202 causes a portion of the network traffic directed to the subscribing host 204 to be rerouted to the network protection service 202, wherein a determination as to what portion is to be rerouted is based on a variety of criteria including, but not limited to, the sources originating the network traffic, the targeted domain of the subscribing host 204, the processing capacity of the subscribing host, and the like.

For routing and rerouting network traffic, the network protection service 202 may keep the actual network address of the subscribing host 204, i.e., the subscribing host's IP address, likely obtained during a subscription process, and using the actual network address, the network protection service 202 can route/reroute a percentage of all traffic or, alternatively, detect and route legitimate traffic to the subscribing host. The network traffic may be rerouted via the actual network address (without asking the DNS servers to resolve any network names) or, alternatively (and as shown in FIG. 3B), a private port or other communication channel may be opened with the subscribing host 204 through which the network protection service 202 can reroute a level of traffic which the subscribing host can process. This communication channel 304 is illustrated in FIG. 3B between the subscribing host 204 and the network protection service 202.

It should be further appreciated that the subscribing host 204 may be entirely unable to process any network traffic at a particular time. Under these circumstances, the network protection service 202 may simply "drop" all incoming network traffic. Still further, an agreement may be made between the network protection service 202 and the subscribing host 204 for the network protection service, when providing assistance to the subscribing host, to respond to various communications directed to the subscribing host. More particularly, based on information provided to the network protection service 202 from the subscribing host 204 or from information learned from monitoring traffic to and from the subscribing host, when traffic is routed through the network protection service, the network protection service may respond to network traffic directed to the subscribing host. For example, the network protection service 202 may identify and respond to network traffic that requests determinative or static information. The response may be based on information cached by the network protection service 202 or generated as a result of determinative rules stored by the network protection service. Responding to network traffic directed to the subscribing host 204 may be implemented irrespective of whether or not the subscribing host is capable of processing network traffic. Assuming the subscribing host 204 is capable of processing the network traffic, the subscribing host may also be capable of responding to the filtered network traffic. The responses to the filtered network traffic may be accomplished either through the network protection service 202, or directly to the intended recipients over the network.

As those skilled in the art will appreciate, a DoS or DDoS attack eventually is eliminated or subsides such that normal network conditions are restored to the network environment generally, and to the subscribing host particularly. Accordingly, another aspect of the network protection service is to determine when to withdraw its protective assistance from a subscribing host. There are a variety of conditions under which the network protection service can withdraw its protective assistance which include, but are not limited to, a specific signal from the subscribing host to withdraw its assistance when the network protection service determines that the level of threat posed by current adverse network traffic falls within the capabilities of the subscribing host to manage, when the subscribing host has made arrangements internally or externally to address the prevailing adverse network conditions, and the like. Of course, while providing protective assistance to a subscribing host, the network protection service may be providing information to the subscribing host regarding the prevailing network conditions such that the subscribing host may make an informed decision regarding how and when to transition out of the protective assistance implemented by the network protection service.

As a result of previous and ongoing analysis of the network conditions affecting a subscribing host, which analysis is described in greater detail below, the network protection service may devise protection mechanisms that can be implemented by the subscribing host to protect itself from the various attacks (DoS, DDoS, poison pill, etc.) which have thus far required protective assistance from the network protection service. These self-protection measures may be provided to the subscribing host as part of the protection/assistance subscription with the network protection service or offered to the subscribing host as a premium service.

In withdrawing assistance from the subscribing host, the network protection service 202 will update the information at the DNS servers in the network 108 to redirect network traffic back to the subscribing host 204. In other words, the actual network address (or addresses) corresponding to the subscribing host's name at the DNS servers 214-218 is updated to point back to the subscribing host 204. Redirecting network traffic back to the subscribing host 204 may be implemented en masse or, alternatively, in measured steps in order to ensure that the subscribing host is sufficiently capable of handling the prevailing network conditions. Of course, the subscribing host 204 may update the DNS servers 214-218 on the network 108, though it would be beneficial to advise the network protection service 202, to allow meter termination if the protection is a metered service.

Figure 4:
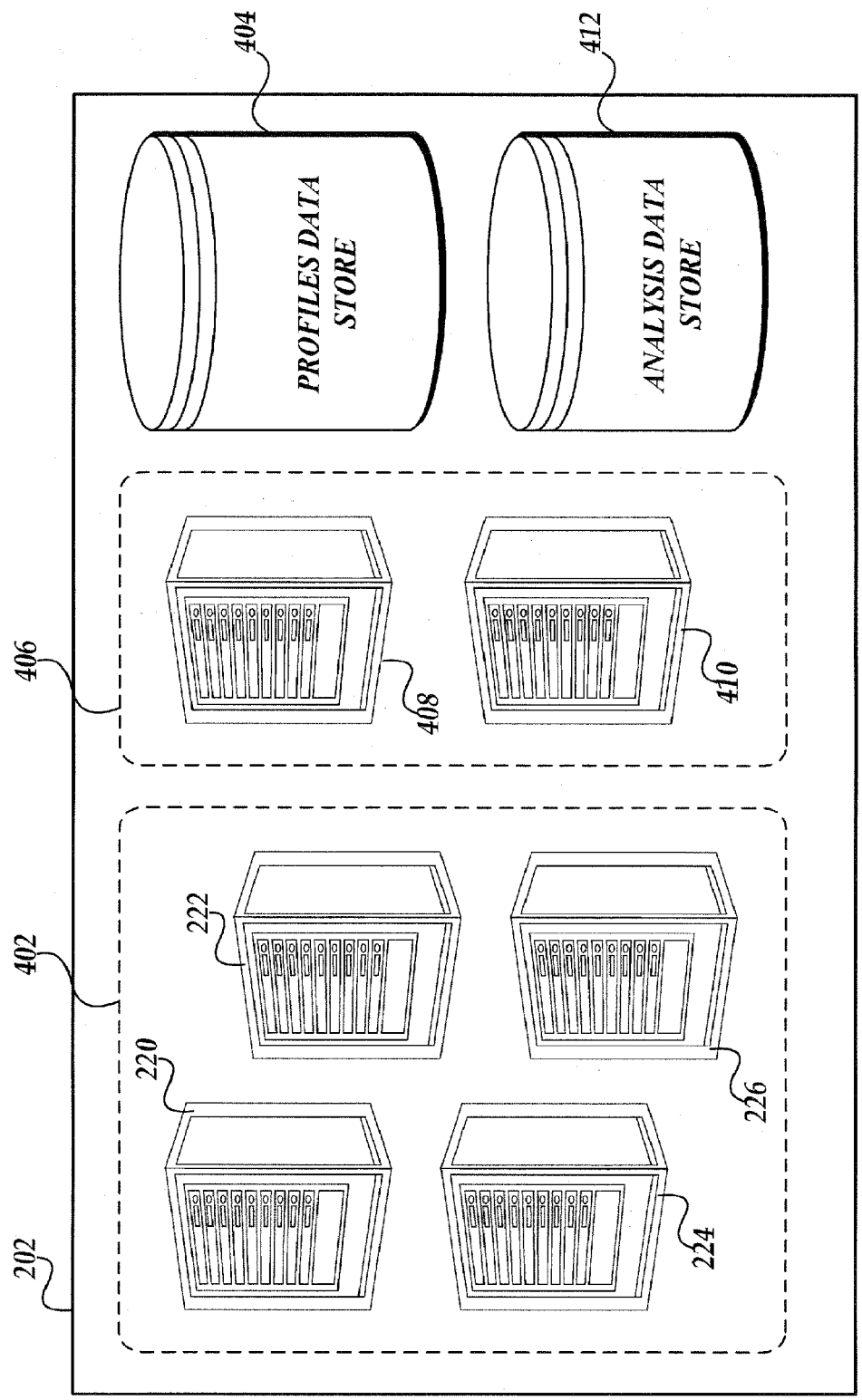
FIG. 4 is a pictorial diagram of illustrative components of a network protection service suitable for providing protective assistance to a subscribing host during times of adverse network conditions.

To further illustrate the network protection service 202, FIG. 4 is a pictorial diagram of illustrative components of a network protection service 202 suitable for providing protective assistance to a subscribing host 204 during times of adverse network conditions. As indicated above, the network protection service 202 includes one or more devices for processing (including routing, filtering, rejecting, and the like) network traffic that is routed through the network protection service to assist a subscribing host 204. The one or more device(s) is typically connected to the network 108 via a high-speed high-capacity connection (not shown). As further shown in FIG. 4, the network protection service includes a set 402 of four devices, 220-224, for processing network traffic; but this is by way of example only and should not be construed as limiting upon the disclosed subject matter.

As mentioned above, as part of establishing a subscription to the protection offered by the network protection service 202, the network protection service obtains information from the subscribing host 204 such as, but not limited to, the type of protection that will be offered, the conditions under which the protection will be activated, the network address of the subscribing host, information regarding static responses, and the like. All of this information is stored as a profile for the subscribing host in a profiles data store 404.

Also included in at least one embodiment is a set 406 of computing devices for conducting analysis of network traffic, referred to hereafter as the analysis servers, both in regard to particular subscribing hosts and traffic in general. By way of example only, there are two analysis servers 408 and 410 illustrated in FIG. 4 in the set 406 of analysis servers. As the analysis servers will generate information germane to network traffic generally and not just to a specific subscribing host, the network protection service will also optionally include an analysis information store 412. Information general to the network 108 and network traffic, as well as the various attacks, against which the network protection service is designed to protect, will likely be located in the analysis information store 412.

In providing the most basic protection to a subscribing host 202, the network protection service 204 redirects all network traffic intended for the subscribing host and filters the network traffic to a volume that can be managed by the subscribing host by dropping that amount that cannot be managed by the subscribing host. "Dropping" network traffic may be accomplished by simply not responding at all to a particular network request, or providing a default response. In its most basic configuration, filtered traffic is selected randomly from the total volume of network traffic or according to some heuristics unassociated with the type and nature of network traffic.

While basic filtering may protect the subscribing host 204 from catastrophic failure, it unfortunately does nothing to ensure that legitimate traffic flows to the subscribing host. As such, it is important for the subscribing host 204 that the network protection service 202 implements more intelligent rules for selecting/filtering traffic. These rules may be established according to information exchanged when establishing a subscription relationship between the subscribing host and the network protection service. By way of example, but not meant as limiting on the disclosed subject matter, information includes conditions under which protection should be implemented, common legitimate network requests fielded by the subscribing host, common network request patterns, the volume of network traffic that the subscribing host can tolerate, as well as general features that would tend to identify and distinguish legitimate requests from a flood of requests aimed simply at overwhelming the subscribing host 204. Based on this exchange of information during the subscription process, the network protection service 202 can define a set of rules or heuristics that will enable the network protection service to begin to filter illegitimate network traffic from legitimate traffic. These rules will typically be stored in association with or in the subscribing host's profile in the profiles data store 404.

As part of the exchanged information, the subscribing host 204 may further indicate particular network requests for static information or easily-determined information. For example, the "home" page for a subscribing host may be static in nature or have easily-determined dynamic features such as date fields, times, and the like. When this type of information can be identified, the network protection service 202 can cache the static information and include a rule in the subscribing host's profile to retrieve the information from the cache rather than forwarding it on to the subscribing host.

Of course, in additional embodiments, beyond establishing initial rules for filtering network traffic, the network protection service 202 may continually refine and augment the heuristics or rules for filtering traffic to a subscribing host, as well as determining conditions under which protection should be set in place. For example, the network protection service 202, may periodically route traffic through the network protection service to the subscribing host so that the traffic can be analyzed by the analysis servers 406. During these times, the analysis servers 406 can analyze both the incoming traffic and the subscribing host's response to the traffic. This information may lead to identifying when the subscribing host 204 struggles with a particular response, thereby indicating a potential poison pill and correspondingly, creating one or more rules for handling the poison pill. Still further, network requests can be analyzed by the analysis servers for patterns that can then be reduced to one or more rules or heuristics.

Heuristics or rules may be implemented in a variety of formats suitable for implementation by the network protection service. In one embodiment, the heuristics are implemented as condition/action pairs. Functionally, a condition/action pair may be viewed in terms of an "if/then" statement that follows the pattern: "If <condition> then <action>." It is further anticipated that the condition/action pairs may be nested to form more complex statements for filtering network traffic. Alternatively, heuristics may be implemented in other manners and be based on both deterministic criteria as well as non-deterministic criteria (such as fuzzy logic, neural network processing, and the like.)

While the network protection service 202 beneficially uses rules or other heuristics as a way to filter network traffic flowing to the subscribing host 204, many of the same rules may also be beneficially implemented on/by the subscribing host. For example, if the network protection service 202 were to identify a particular poison pill that the subscribing host 204 is unable to otherwise resolve, the subscribing host could implement its own local filtering based on the rules such that when the poison pill request arrived, it would be rejected. Thus, the network protection service 202 may offer the rules back to the subscribing host 204.

In addition to analyzing the network traffic to improve its filtering techniques, the analysis servers 406 may be further applied in determining when protection should be applied to the subscribing host as well as under what conditions the service's protective assistance should be withdrawn.

It should be appreciated that while the above described analysis for defining heuristics and/or rules for filtering network traffic has been discussed with regard to periodic examination of normal network traffic, this same analysis may be implemented during those times that the network protection service 202 is already actively assisting the subscribing host 204, i.e., under adverse network conditions. Indeed, depending on the particular agreement between the subscribing host and the network protection service, the network protection service may only monitor the traffic during times of adverse network conditions.

Figure 5:
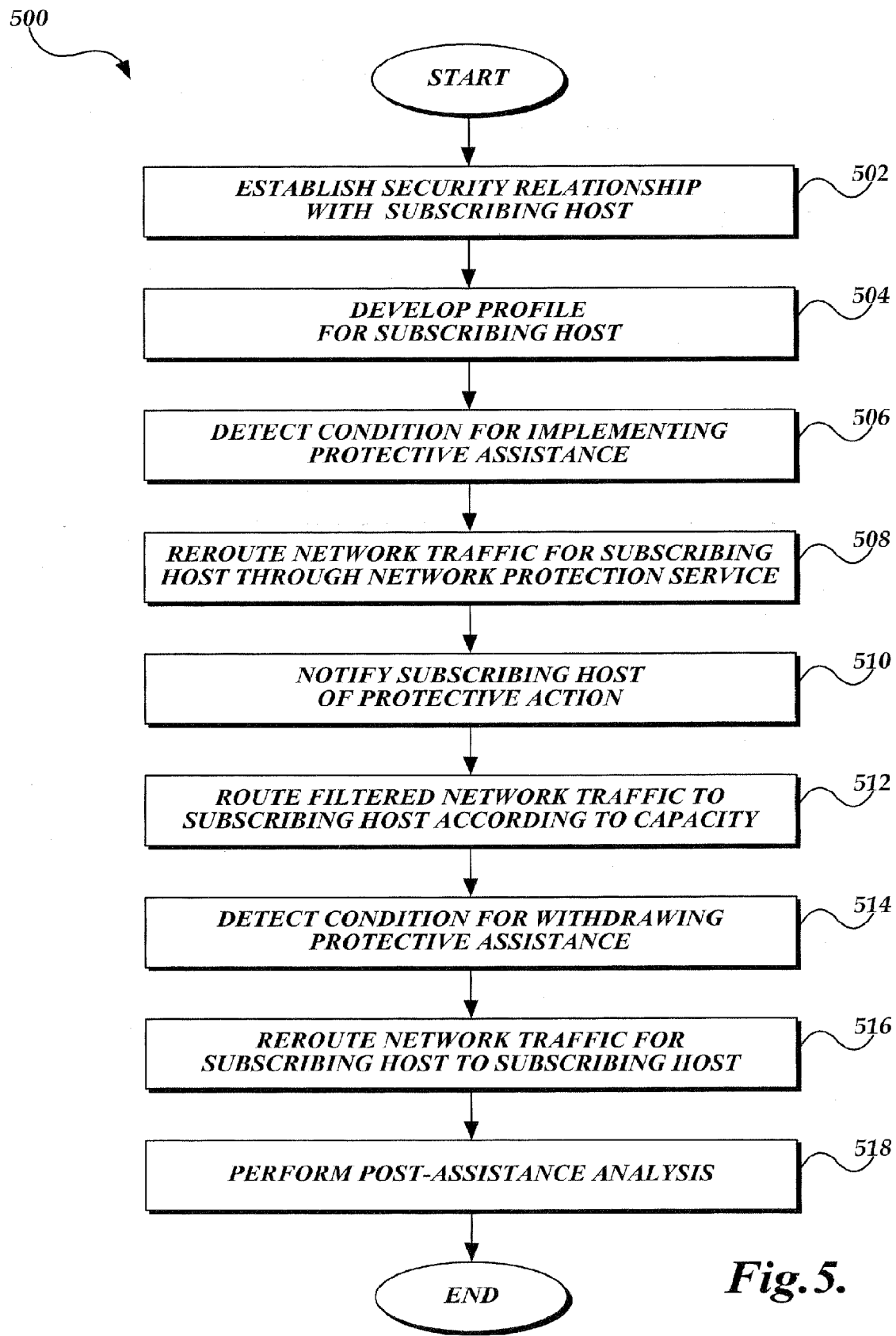
FIG. 5 is a flow diagram of an illustrative routine for providing protective assistance to a subscribing host by a network protection service.

Building on the description of the network protection service 202, a method for providing protective assistance to a subscribing host 204 is now described. FIG. 5 is a flow diagram of an illustrative routine 500 for providing protective assistance to a subscribing host 204 as implemented by a network protection service 202. Beginning at block 502, a security relationship is established with a subscribing host 204. In order to effectively provide protective assistance, the subscribing host 204 and the network protection service 202 are interconnected via a network 108.

As part of establishing the security relationship with the subscribing host 204, at block 504, the network security service establishes and/or develops a profile for the subscribing host. As described above, establishing a profile for the subscribing host 204 will include obtaining information from the subscribing host 204 such as the type and level of assistance requested, the network address, how network traffic, if any, is to be routed to the subscribing host, the conditions for implementing and withdrawing protective assistance, and the like. The information obtained from the subscribing host 204 is reduced to rules that are stored as part of or in association with the subscribing hoses profile in the profiles data store 504.

At block 506, the network protection service 202 detects a condition for implementing protective assistance for the subscribing host 204. This detected condition, also referred to as a triggering condition, may be a message received from the subscribing host 202 requesting assistance or advising the network protection service 202 that the host is experiencing adverse network traffic. Alternatively, the detected condition may be based on a human initiated, non-network related contact requesting protective assistance, the absence of communication from the subscribing host 202, or determined from an evaluation of the network traffic directed at the subscribing host 204.

At block 508 the network protection service 202 implements the protective assistance by rerouting at least some of the network traffic directed to the subscribing host 204 through the network protection service. It should be appreciated that not all of the network traffic need be redirected/rerouted through the network protection service 202, and the amount of traffic rerouted through the network protection service may be a function of the capacity of the subscribing host 204 to manage the volume of network traffic. In one embodiment, the network protection service 202 modifies the actual network address for the subscribing host 204 as stored on one or more DNS servers to point to the network protection service. In an alternative embodiment, the subscribing host 204 may participate in the protection by routing/forwarding all network traffic to the network protection service 202 upon receipt at its normal communication channels.

At block 510, the network protection service 202 notifies the subscribing host 204 of the protective action taken. Of course, this notification may take place before the protective action is implemented. In any event, it is likely important that the subscribing host 204 be made aware protective action is being made on its behalf, including that all or some of the network traffic directed to it has been rerouted to the network protection service.

At block 512, the network protection service 202 processes the rerouted network traffic for the subscribing host 204. In one embodiment, processing the rerouted network traffic includes filtering the network traffic flowing through the service and routing the filtered traffic to the subscribing host 204. In one embodiment, the amount of received network traffic that is filtered out depends upon the processing capacity of the subscribing host and may be determined at the time of routing the traffic to the host. The filtered traffic that is to be forwarded to the subscribing host may be directed to the host's typical communication address (as maintained by the network security service in the host's profile) or directed to the host via a private communication channel opened between the subscribing host and the network security service. In one embodiment, the network traffic is filtered according to various rules or heuristics associated with the subscribing host 204.

Processing the rerouted network traffic also may include any or all of the following: maintaining statistics regarding the current network traffic directed to the subscribing host; providing the subscribing host 204 status updates with regard to ongoing protective assistance; logging the rerouted network traffic for post-assistance analysis; analyzing the network traffic to refine the rules and/or heuristics for filtering the traffic for the subscribing host; determining protective actions that the subscribing host may implement to protect itself from the adverse network conditions; responding to requests for static information from a local cache; continually evaluating the abilities and status of the subscribing host; and the like.

At block 514, while processing the network traffic as described above in regard to block 512, a condition, i.e., a withdraw condition, is detected for withdrawing the protective assistance currently implemented in favor of the subscribing host 204. As indicated above, the condition may be a signal from the subscribing host 204, a determination that the adverse network traffic has subsided to a level manageable by the subscribing host, and the like.

Once the condition to withdraw assistance is detected, at block 516 network traffic directed to the subscribing host 204 is routed directly to the subscribing host. More particularly, to undo the rerouting of the network traffic to the network protection service 202, the network protection service causes that the network traffic directed to the subscribing host 204 be routed to the subscribing host. As mentioned above, the network protection service 202 may withdraw all protective assistance upon detecting the condition to withdraw the protective assistance, or withdraw the assistance in phases to ensure that the subscribing host 204 indeed has the capacity to handle the network traffic. Withdrawing the protective assistance will typically include updating the network address associated with the subscribing host's network name to the subscribing host's actual network address at the DNS servers.

In addition to returning the flow of network traffic directed to the subscribing host 204 back to the subscribing host, at block 518 an optional post-assistance analysis is performed. By way of example and not limitation, a post-assistance analysis will likely include generating statistics regarding the network traffic received and processed during the protective assistance, the amount of processing resources that the network protection service 202 used to assist the subscribing host 204, protective measures that may be implemented on the subscribing host to protect itself from the adverse network conditions, analysis of the logged network traffic to recognize patterns, and the like, to the end that the rules for filtering network traffic are improved, by way of suggestions for improved protection, analysis regarding the misdiagnosis of illegitimate and/or legitimate network traffic, and the like. Once the post-assistance analysis is performed, if at all, the exemplary routine 500 terminates.

Figure 6:
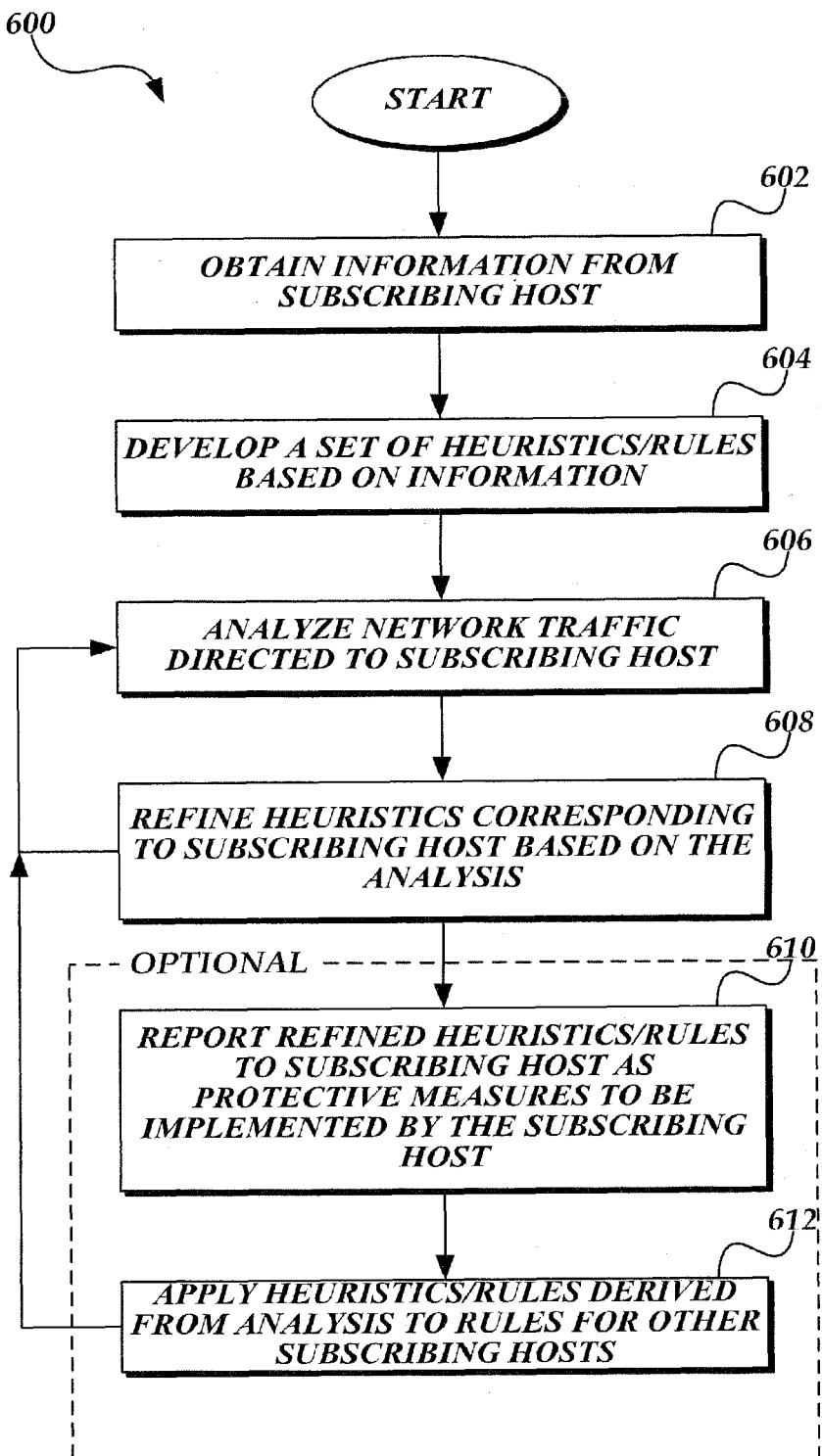
FIG. 6 is a flow diagram of an illustrative routine for generating and refining heuristics or rules for filtering network traffic directed to a subscribing host as implemented on a network subscription service.

Turning now to generating heuristics or rules for filtering network traffic, FIG. 6 is a flow diagram of an illustrative routine 600 for generating and refining the rules for filtering network traffic directed to a subscribing host 204 as implemented on a network subscription service 202. It should be appreciated that refining the rules for filtering network traffic directed to a subscribing host 204 may comprise modifying or deleting existing rules as well as adding additional rules to those already existing. Additionally, while the analysis described below may be carried out at the same time that the network protection service 202 is processing network traffic for a subscribing host 204, logically the analysis may be performed asynchronously to the processing of network traffic for the subscribing host 204.

Beginning at block 602, information is obtained from the subscribing host 204. This information likely corresponds to the information obtained during the subscription process as described above in regard to blocks 502 and 504 of FIG. 5. In addition to using information obtained from the subscribing host 204, the network protection service 202 may also rely upon other information generally applicable to network traffic as determined by one or more analysis servers 406 and stored in the analysis data store 412 (FIG. 4). Accordingly, at block 604, the network protection service 202 develops one or more rules for filtering traffic for the subscribing host 204.

At block 606, in monitoring network traffic directed to the subscribing host 204 (whether or not the monitoring is in conjunction with presently providing protective assistance to the subscribing host, or from logged information), the analysis servers 406 analyze the monitored network traffic in an effort to determine what is legitimate traffic versus what represents illegitimate and/or adverse network traffic. At block 608, information such as patterns of network traffic, typical network sites, poison pills, normal network traffic volumes, and the like, are derived and reduced to heuristics or rules. Of course, heuristics or rules derived from the analysis may be nested in order to develop more complex and sophisticated "rules" for protecting the subscribing host 204. Other information that may be derived from the monitored traffic is static information such that it may be cached by the network protection service 202 for future times when protective assistance is needed, and the network protection service can respond to a request for static information without forwarding the request to the subscribing host.

In one embodiment, the process of monitoring traffic, analyzing the monitored traffic, and reducing the analysis to one or more refined rules is an ongoing process, as indicated by the arrow from block 608 to block 606. However, in an optional embodiment, after reducing the analysis to rules, at block 610, the network security service 202 may optionally provide the refined rules to the subscribing host 204 for implementation on the host. These are typically offered to the subscribing host as security measures that may be implemented on the host to protect itself from adverse network traffic. As above, the monitoring, analysis, and refinement steps are continued, as indicated by the arrow from block 610 to block 606.

It should be appreciated that numerous benefits are realized by analyzing the monitored network traffic. As indicated above, ongoing analysis produces improved rules for filtering network traffic. These improved/refined rules lead to more efficient handling of rerouted network traffic by the network protection service 202, which equates to reduced costs for providing protective assistance to a subscribing host 204. Relatedly, the refined rules enable the network protection service to better identify and distinguish legitimate network traffic from illegitimate traffic and/or poison pills. As a result, network traffic that is ultimately routed to the subscribing host 204 will include a substantially larger percentage of legitimate traffic. As the ongoing analysis continues to refine and improve the rules, the network protection service 202 can potentially filter legitimate network traffic for delivery to the subscribing host 204 in order to maximize the throughput of the host according to its current capacity to handle network traffic. In other words, based on the refined rules and information learned from monitoring the network traffic flowing to and from the subscribing host, and given that the subscribing host may not be able to handle all legitimate traffic at a particular time, the network protection service 202 can filter even legitimate traffic to maximize the network throughput of the subscribing host. Finally, the rules determined for one subscribing host 204 have general applicability to other subscribing hosts, such that the network protection service 202 can leverage the information derived by monitoring one host to all subscribed hosts.

Figure 7:
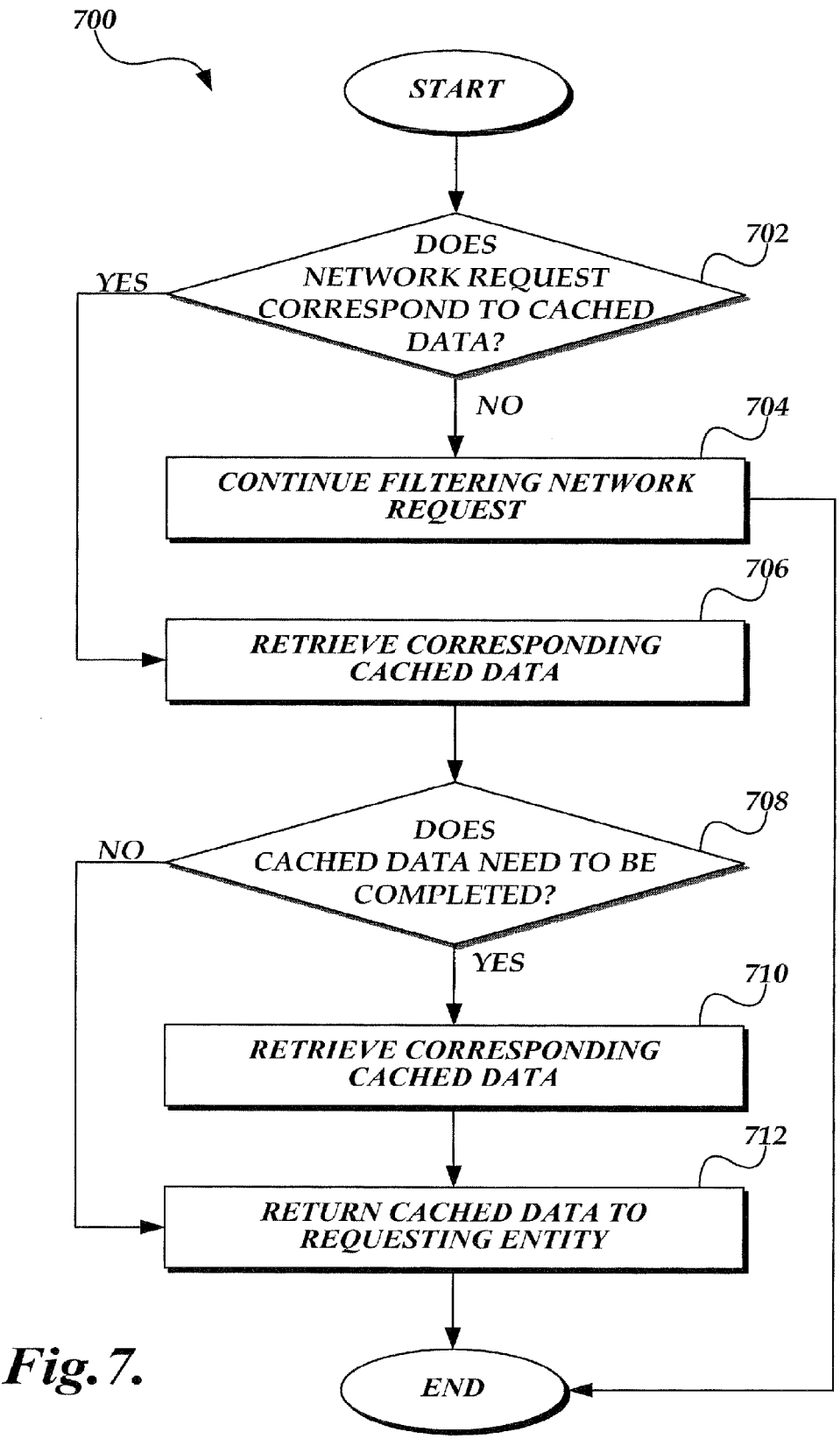
FIG. 7 is a flow diagram of an illustrative routine for responding to network traffic on behalf of a subscribing host.

As indicated above, the network protection service 202 may obtain information (either from the subscribed host 204 or from monitoring network traffic flowing to and from the subscribed host) regarding static or easily determined responses to network requests. FIG. 7 is a flow diagram of an illustrative routine 700 for responding to network traffic on behalf of a subscribing host 204. Beginning at decision block 702, a determination is made regarding whether a received network request (i.e., network traffic that requests data from the subscribing host 204) corresponds to data cached by the network protection service 202 in conjunction with the subscribing host 204. As the network protection service 202 is handling traffic intended for subscribing host 204, it is helpful for the network protection service 202 to store data in memory, or cache data, ahead of time for known request-response pairs. When an incoming network message (intended for the subscribing host 204 as part of the network traffic) is received requesting information or resources, the network protection service 202 locates and responds with the requested information or resources. The subscribing host 204 may be able to identify common requests and provide the corresponding responses to the network protection service 202 a priori. At a minimum, the data to generate the web page requested may be cached for retrieval by the network protection service 202. In one example, if the subscribing host 204 provides a weather forecasting service, the data detailing the five day forecasts for major cities may be cached at the network protection service 202. When a request is received for the five day forecast for one of the major cities, the network protection service 202 is able to retrieve this information from memory, and is therefore, able to respond to the request without communicating with the subscribing host 204. If the network request is not for cached data, at block 704, the network request is processed in conjunction with the rule associated with the subscribing host 204. Thereafter, the routine 700 terminates.

If the network request corresponds to data cached by the network protection service 202, at block 706, the cached data corresponding to the network request is retrieved. At decision block 708, a determination is made as to whether the cached data needs to be completed in some way before being returned to the requesting entity. Completing the cached data will correspond to fields of data that can be readily completed by the network protection service without the assistance of the subscribing host 204 or the information stored thereat. If the cached data does not need to be completed, the routine proceeds to block 712, where the cached data is returned to the requesting entity. Alternatively, if the cached data is to be completed by the network protection service 202, at block 710, the various fields of the cached data that require completion are updated. Subsequently, at block 712, the completed cached data is returned to the requesting entity. Thereafter, the exemplary routine 700 terminates.

While the above discussion regarding the role of the network protection service 202 has been in regard to an active role in providing protective assistance, in an alternative embodiment, the network protection service 202 may be beneficially utilized as simply a monitoring and/or analysis service. More particularly, the network protection service 202 may simply monitor for adverse network conditions directed to a subscribing host 204 such that the network protection service can provide early warning of the adverse conditions, i.e., before the conditions overwhelm the host. In addition to monitoring for adverse network conditions, the network protection service 202 may provide analysis of the adverse conditions, notification as to when the adverse network conditions subside, information regarding protective measures to be implemented on the subscribing host 204 to protect itself from the adverse network conditions, and the like.

It should also be appreciated that aspects of the disclosed subject matter may be embodied as a single software module, a collection of software modules distributed on one or more computing devices, a combination of software and hardware modules, a hardware module, or a collection of hardware modules. Moreover, when embodied all or in part as one or more software modules, the software may be distributed on a tangible computer-readable medium, including but not limited to, a CD-ROM, a DVD-ROM, flash memory and/or flash memory devices, and the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system comprising:
   one or more computing devices; and
   one or more memories with stored instructions that, when executed by the one or more computing devices, cause the one or more computing devices to provide functionality of an online network protection service by:
   receiving, based at least in part on a request from a client that is supplied to the online network protection service via one or more electronic communications sent over one or more computer networks between the online network protection service and a computing device of the client, instructions to monitor for specified conditions;
   determining, by the online network protection service, that network traffic directed to a host system of the client satisfies the specified conditions;
   causing, by the online network protection service and based at least in part on the specified conditions being satisfied, at least a subset of the network traffic directed to the host system to be rerouted to the one or more computing devices instead of to the host system; and forwarding, to the host system by the one or more computing devices, and based at least in part on information supplied by the client in the one or more electronic communications, a portion of the rerouted network traffic that is not rejected by the online network protection service.

2. The system of claim 1 wherein the receiving of the instructions includes receiving instructions to establish a relationship involving the online network protection service providing protective assistance to the host system under the specified conditions, and wherein the stored instructions further cause the one or more computing devices to establish the relationship and to provide the protective assistance to the host system.

3. The system of claim 1 wherein the online network protection service provides a plurality of computing devices that include the one or more computing devices, and wherein the causing of the at least subset of the network traffic to be rerouted to the one or more computing devices of the online network protection service includes allocating, by the online network protection service and in response to the determining that the network traffic directed to the host system satisfies the specified conditions, computing resources of the online network protection service to assist the host system that include the one or more computing devices.

4. The system of claim 1 wherein the receiving of the instructions includes receiving, by the online network protection service, information from the client that specifies a type of protective assistance for the online network protection service to provide to the host system, and wherein the stored instructions further cause the online network protection service to determine rules for use in providing the specified type of protective assistance to the host system.

5. The system of claim 1 wherein the receiving of the instructions includes receiving, by the online network protection service, information from the client that indicates the specified conditions, and wherein the stored instructions further cause the online network protection service to determine that the network traffic directed to the host system satisfies the specified conditions by monitoring the network traffic directed to the host system and identifying the specified conditions being satisfied.

6. The system of claim 1 wherein the receiving of the instructions includes receiving, by the online network protection service, information from the client that indicates how to filter network traffic directed to the host system, and wherein the stored instructions further cause the online network protection service to analyze the rerouted network traffic and to reject some of the rerouted network traffic based at least in part on the received information.

7. The system of claim 1 wherein the determining that the network traffic directed to the host system satisfies the specified conditions includes receiving, by the online network protection service, an electronic communication from the host system that includes information related to the specified conditions.

8. The system of claim 1 wherein the determining that the network traffic directed to the host system satisfies the specified conditions is based at least in part on identifying, by the online network protection service, a lack of communications from the host system.

9. The system of claim 1 wherein the determining that the network traffic directed to the host system satisfies the specified conditions includes receiving, by the online network protection service, information sent to the online network protection service by a human representative of the client that identifies the specified conditions.

10. The system of claim 1 wherein the providing of the functionality of the online network protection service includes determining, by the online network protection service, a current capacity of the host system for processing network traffic, and selecting, by the online network protection service, the portion of the rerouted network traffic to forward to the host system based at least in part on the determined current capacity.

11. The system of claim 1 wherein the providing of the functionality of the online network protection service includes analyzing, by the one or more computing devices of the online network protection service, one or more responses of the host system to the forwarded portion of the rerouted network traffic, and further providing protective assistance to the host system based at least in part on the analyzing of the one or more responses.

12. The system of claim 1 wherein the providing of the functionality of the online network protection service includes analyzing, by the one or more computing devices of the online network protection service, the rerouted network traffic to identify an attack on the host system, and selecting the portion of the rerouted network traffic to forward to the host system to be legitimate network traffic that is not part of the attack.

13. The system of claim 1 wherein the providing of the functionality of the online network protection service includes caching, by the one or more computing devices of the online network protection service, responses of the host system to received requests, and further providing protective assistance to the host system based at least in part on the cached responses.

14. A computer-implemented method comprising:
receiving, by an online network protection service implemented on one or more computing systems and via one or more electronic communications sent over one or more computer networks between the one or more computing systems and a computing device of a client, a request for the online network protection service to provide protective assistance to a host system of the client during specified conditions indicated by the client and in a manner based on information supplied by the client;

providing, by the online network protection service, the protective assistance to the host system, including monitoring network traffic directed to the host system and identifying the specified conditions;

causing, by the online network protection service and based at least in part on the identifying of the specified conditions, at least some of the network traffic directed to the host system to be rerouted to the online network protection service instead of to the host system;

rejecting, by the online network protection service, a first portion of the rerouted network traffic; and forwarding, to the host system by the online network protection service, a second portion of the rerouted network traffic that is not rejected.

15. The computer-implemented method of claim 14 wherein the online network protection service includes multiple computing devices, and wherein the causing of the at least some of the network traffic to be rerouted to the online network protection service includes allocating, by the online network protection service and in response to the identifying of the specified conditions, one or more computing devices of the multiple computing devices to assist the host system, and wherein the rejecting and the forwarding are performed by the allocated one or more computing devices.

16. The computer-implemented method of claim 14 wherein the receiving of the request includes, by the online network protection service, receiving information from the client that specifies a type of protective assistance for the online network protection service to provide to the host system and establishing a relationship between the client and the online network protection service, and wherein the providing of the protective assistance to the host system includes providing the specified type of protective assistance.

17. The computer-implemented method of claim 14 wherein the receiving of the request includes, by the online network protection service, receiving information from the client that indicates how to filter network traffic directed to the host system, and wherein the rejecting of the first portion of the rerouted network traffic is based at least in part on the received information.

18. A non-transitory computer-readable medium containing computer-executable instructions that, when executed, configure one or more computing devices of an online network protection service to at least:

receive, by the one or more computing devices of the online network protection service via one or more electronic communications sent over one or more computer networks between the online network protection service and a computing device of a client, a request for the online network protection service to provide protective assistance to a host system of the client under specified conditions indicated by the client and based on information supplied by the client;

provide, by the one or more computing devices of the online network protection service, the protective assistance to the host system, including monitoring network traffic directed to the host system and identifying the specified conditions;

cause, by the one or more computing devices of the online network protection service, and based at least in part on the identifying of the specified conditions, at least some of the network traffic directed to the host system to be rerouted to the online network protection service instead of to the host system; and manage, by the online network protection service, the rerouted network traffic on behalf of the host system.

19. The non-transitory computer-readable medium of claim 18 wherein the managing of the rerouted network traffic on behalf of the host system includes rejecting, by the one or more computing devices of the online network protection service, a first portion of the rerouted network traffic, and forwarding, to the host system by the one or more computing devices of the online network protection service, a second portion of the rerouted network traffic that is not rejected.

20. The non-transitory computer-readable medium of claim 18 wherein the online network protection service includes multiple computing devices, and wherein the causing of the at least some of the network traffic to be rerouted to the online network protection service includes allocating, by the online network protection service and in response to the identifying of the specified conditions, at least one computing device of the multiple computing devices to assist the host system, and wherein managing of the rerouted network traffic is performed by the allocated at least one computing device.

\* \* \* \* \*